United States Patent
Cepulis et al.

(10) Patent No.: US 7,143,275 B2
(45) Date of Patent: Nov. 28, 2006

(54) SYSTEM FIRMWARE BACK-UP USING A BIOS-ACCESSIBLE PRE-BOOT PARTITION

(75) Inventors: Darren J. Cepulis, The Woodlands, TX (US); Eugene Callegari, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 565 days.

(21) Appl. No.: 10/210,274

(22) Filed: Aug. 1, 2002

(65) Prior Publication Data

US 2004/0025002 A1  Feb. 5, 2004

(51) Int. Cl.
*G06F 15/177* (2006.01)

(52) U.S. Cl. .................. 713/1; 713/2; 714/5; 714/6; 714/36; 714/38; 365/186.33

(58) Field of Classification Search .................. 713/1–2; 714/5–6, 36, 38; 365/185.33
See application file for complete search history.

(56) References Cited

U.S. PATENT DOCUMENTS

| | | | | |
|---|---|---|---|---|
| 4,980,836 A | 12/1990 | Carter et al. | ................. | 364/483 |
| 5,014,193 A | 5/1991 | Garner et al. | ................. | 364/200 |
| 5,144,551 A | 9/1992 | Cepulis | ................. | 395/425 |
| 5,410,706 A | 4/1995 | Farrand et al. | ................. | 395/700 |
| 5,432,927 A * | 7/1995 | Grote et al. | ................. | 713/2 |
| 5,491,788 A | 2/1996 | Cepulis et al. | ................. | 395/182.11 |
| 5,497,497 A | 3/1996 | Miller et al. | ................. | 395/800 |
| 5,596,759 A | 1/1997 | Miller et al. | ................. | 395/750 |
| 5,729,675 A | 3/1998 | Miller et al. | ................. | 395/183.12 |
| 5,860,142 A | 1/1999 | Cepulis | ................. | 711/202 |
| 5,867,703 A | 2/1999 | Miller et al. | ................. | 395/651 |
| RE36,189 E | 4/1999 | Carter et al. | ................. | 395/750.06 |
| 6,055,596 A | 4/2000 | Cepulis | ................. | 710/104 |
| 6,061,754 A | 5/2000 | Cepulis et al. | ................. | 710/126 |
| 6,223,271 B1 | 4/2001 | Cepulis | ................. | 711/206 |
| 6,308,265 B1 * | 10/2001 | Miller | ................. | 713/2 |
| 6,314,515 B1 | 11/2001 | Miller et al. | ................. | 713/1 |
| 6,397,268 B1 | 5/2002 | Cepulis | ................. | 710/8 |
| 6,459,624 B1 * | 10/2002 | Kuo | ................. | 365/185.33 |
| 6,463,550 B1 | 10/2002 | Cepulis et al. | ................. | 714/25 |
| 6,496,945 B1 | 12/2002 | Cepulis et al. | ................. | 714/25 |
| 6,629,259 B1 * | 9/2003 | Lee | ................. | 714/2 |
| 6,651,188 B1 * | 11/2003 | Harding et al. | ................. | 714/38 |
| 6,715,106 B1 * | 3/2004 | Mermelstein | ................. | 714/36 |
| 6,732,267 B1 * | 5/2004 | Wu et al. | ................. | 713/100 |
| 6,745,278 B1 * | 6/2004 | Oba | ................. | 711/103 |
| 6,745,329 B1 * | 6/2004 | Kao | ................. | 726/24 |
| 6,757,838 B1 * | 6/2004 | Chaiken et al. | ................. | 714/5 |
| 6,789,158 B1 * | 9/2004 | Takahashi | ................. | 711/103 |
| 6,792,556 B1 * | 9/2004 | Dennis | ................. | 714/6 |
| 6,892,323 B1 * | 5/2005 | Lin | ................. | 714/36 |
| 6,934,873 B1 * | 8/2005 | Lu et al. | ................. | 714/2 |
| 7,010,679 B1 * | 3/2006 | Yang | ................. | 713/2 |
| 2003/0120913 A1 * | 6/2003 | Wu et al. | ................. | 713/100 |

\* cited by examiner

Primary Examiner—A. Elamin

(57) ABSTRACT

The disclosed embodiments relate generally to providing cost-effective data integrity in computer systems and, more particularly, to providing a back-up for system firmware in a BIOS-accessible pre-boot environment. Back-up copies of a system BIOS or other firmware are placed on a partition that is accessible to the system BIOS prior to system boot. The back-up copy may be retrieved and loaded if the system BIOS becomes corrupted. Multiple back-up versions may be stored on the partition.

27 Claims, 3 Drawing Sheets

SYSTEM FIRMWARE BACK-UP USING A BIOS-ACCESSIBLE PRE-BOOT PARTITION

BACKGROUND OF THE INVENTION

1. Field of the Invention

The disclosed embodiments relate generally to providing cost-effective data integrity in computer systems and, more particularly, to providing a back-up for system firmware in a BIOS-accessible pre-boot environment.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing the gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

a. The Evolution of Networked Computing and System Management Tools

In addition to improvements in PC hardware and software generally, the technology for making computers more useful by allowing users to connect PCs together and share resources between them has also seen rapid growth in recent years. This technology is generally referred to as "networking." In a networked computing environment, PCs belonging to many users are connected together so that they may communicate with each other. In this way, users can share access to each other's files and other resources, such as printers. Networked computing also allows users to share internet connections, resulting in significant cost savings. Networked computing has revolutionized the way in which business is conducted across the world.

Not surprisingly, the evolution of networked computing has presented technologists with some challenging obstacles along the way. One obstacle is connecting computers that use different operating systems ("OSes") and making them communicate efficiently with each other. Each different OS (or even variations of the same OS from the same company) has its own idiosyncrasies of operation and configuration. The interconnection of computers running different OSes presents significant ongoing issues that make day-to-day management of a computer network challenging.

Another significant challenge presented by the evolution of computer networking is the sheer scope of modern computer networks. At one end of the spectrum, a small business or home network may include a few client computers connected to a common server, which may provide a shared printer and/or a shared internet connection. On the other end of the spectrum, a global company's network environment may require interconnection of hundreds or even thousands of computers across large buildings, a campus environment, or even between groups of computers in different cities and countries. Such a configuration would typically include a large number of servers, each connected to numerous client computers.

Further, the arrangements of servers and clients in a larger network environment could be connected in any of a large number of topologies that may include local area networks ("LANs"), wide area networks ("WANs") and municipal area networks ("MANs"). In these larger networks, a problem with any one server computer (for example, a failed hard drive, corrupted system software, failed network interface card or OS lock-up to name just a few) has the potential to interrupt the work of a large number of workers who depend on network resources to get their jobs done efficiently. Needless to say, companies devote a lot of time and effort to keeping their networks operating trouble-free to maximize productivity.

An important aspect of efficiently managing a large computer network is to maximize the amount of analysis and repair that can be performed remotely (for example, from a centralized administration site). Tools that facilitate remotely analyzing and servicing server problems help to control network management costs by reducing the number of network management personnel required to maintain a network in good working order. System management also makes network management more efficient by reducing the delay and expense of analyzing and repairing network problems. Using remote management tools, a member of the network management team may identify problems and, in some cases, solve those problems without the delay and expense that accompanies an on-site service call to a distant location.

In one system management strategy, a system management processor, which is completely separate from the system microprocessor(s), operates independently to provide system management functionality and remote communication capability. These system management processors have the capability of monitoring and controlling a wide range of system information. Some system management processors may be powered up even when the main computer system that they support is not powered up.

b. The Need for Robustness And Redundant EEPROM Back-Up of BIOS

Modem users of computer systems typically expect very high levels of availability from their systems. To satisfy this desire, manufacturers of computer systems strive to make systems as robust as possible. One way to make computer systems more robust and easier to service or repair is to provide a readily accessible back-up of important system programming such as the system BIOS and/or other firmware. BIOS is an acronym that stands for "Basic Input/Output System." The system BIOS is the low-level programming that controls the configuration and initialization of the computer system. Among other things, the BIOS is responsible for booting the operating system (OS) of the computer system.

A special area of the system BIOS that contains important system programming is the bootblock ROM. The bootblock ROM is highly secure to protect it from data corruption. The programming stored in the bootblack ROM is used to update other portions of the system BIOS and other firmware, for example, by flashing a back-up version of the system BIOS if it becomes corrupted.

The system BIOS is frequently upgraded to add additional features to a computer system or to correct flaws in the programming known as "bugs" that crop up from time to time. System administrators frequently desire to have a back-up of the system BIOS before upgrading to a new version because they can return the system to the backed up version of the BIOS if the new BIOS introduces an incompatibility or other problem into the operation of the computer system.

Another reason to back up system BIOS and other firmware is the possibility of corruption of the system BIOS. The corruption of the BIOS can occur for any number of reasons, such as system power failure during operation of the computer system, errors while flashing the EEPROM of the computer system to upgrade the BIOS or other firmware or the like.

The system BIOS or other system firmware of most computer systems is typically stored in EEPROM memory, such as flash memory. One example of system firmware that may be stored in EEPROM memory is Extensible Firmware Interface (EFI) Code that is typically used in computer systems that implement the IA64 architecture promulgated by Intel Corporation of Santa Clara, Calif. In many systems, an additional back-up copy of the BIOS or other system firmware such as the EFI firmware is also stored in EEPROM memory. If the original BIOS or firmware becomes corrupt, the computer system will probably not be able to boot or otherwise operate correctly.

When the system fails to boot because of corruption of its BIOS or other firmware, a utility program that allows a user to select the back-up version of the firmware is typically provided. The user runs the repair utility and selects the back-up version of the firmware from a menu display to boot the system from the non-corrupted back-up version of the firmware stored in EEPROM memory. The EEPROM memory that is used to store the back-up BIOS or other firmware cannot be used for any other purpose because of the possibility that the back-up BIOS or other firmware might be needed.

As set forth above, the use of non-volatile storage to store a back-up version of the system BIOS or other firmware is expensive. A method and apparatus that provides a reliable back-up of system BIOS or other firmware while reducing the need for costly redundant EEPROM is desirable.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
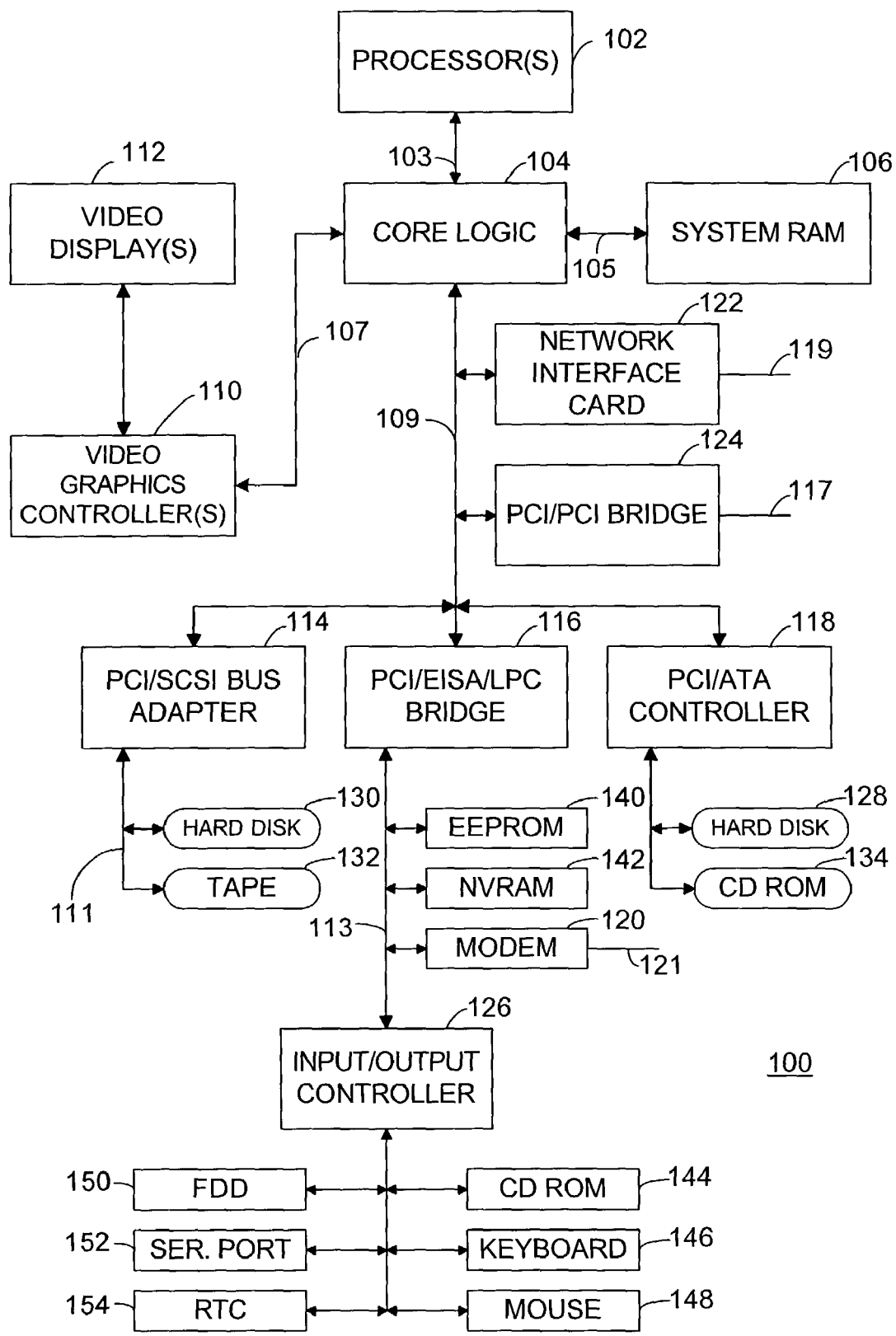
FIG. 1 is a block diagram illustrating a computer system in which the present invention may be practiced.

Referring now to FIG. 1, a schematic block diagram of a computer system utilizing the present invention is illustrated. A computer system is generally indicated by the numeral 100 and comprises a processor (or processor complex comprising multiple central processing units) 102. Also included in the computer system 100 are core logic chipset 104 (or north bridge), system random access memory ("RAM") 106, a video graphics controller(s) 110, a video display(s) 112, a PCI/SCSI bus adapter 114, a PCI/EISA/LPC bridge 116, and a PCI/ATA controller 118. A hard drive 128 and CD ROM drive 134 may be connected to the PCI/ATA controller 118.

Single or multilevel cache memory (not illustrated) may also be included in the computer system 100 according to the current art of microprocessor computer systems. If the computer system 100 includes multiple processors, they may be arranged in a symmetric or asymmetric multi-processor configuration.

The processor 102 is connected to the core logic 104 through a host bus 103. The system RAM 106 is connected to the core logic 104 through a memory bus 105. The configuration registers of the computer system may be incorporated into the processor or in the system RAM 106 (or some combination of the two). The configuration registers may be designed to control the operation of many of the system components shown in FIG. 1.

The video graphics controller(s) 110 is connected to the core logic 104 through an AGP bus 107 (or other bus for transporting video data). The PCI/SCSI bus adapter 114, PCI/EISA/LPC bridge 116, and PCI/ATA controller 118 are connected to the core logic 104 through a primary PCI bus 109. Those of ordinary skill in the art will appreciate that a PCI-X bus or Infiniband bus may be substituted for the primary PCI bus 109. The specific protocol of the bus 109 is not a crucial aspect of the present invention.

Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 100 motherboard (not illustrated). The PCI/PCI bridge 124 provides an additional PCI bus 117.

A hard disk 130 and a tape drive 132 are connected to the PCI/SCSI bus adapter 114 through a SCSI bus 111. The NIC 122 is connected to a local area network 119. The PCI/EISA/LPC bridge 116 connects over a low pin count (LPC) bus 113 to a Electrically Erasable Random Access Memory (EEPROM) 140, a non-volatile random access memory (NVRAM) 142, a modem 120, and an input-output controller 126. The EEPROM 140 may store the system BIOS or other system firmware and may include flash memory.

The NVRAM 142 may store system configuration settings and the like. The NVRAM 142 may include a programmable logic array ("PAL") or any other type of programmable non-volatile storage.

The modem 120 connects to a telephone line 121. The input-output controller 126 interfaces with a keyboard 146, CD-ROM drive 144, mouse 148, floppy disk drive ("FDD") 150, serial/parallel ports 152 and a real time clock ("RTC") 154. The LPC bus 113 is a slower information bus than the PCI bus 109, but it costs less to interface with the LPC bus 113.

Figure 2:
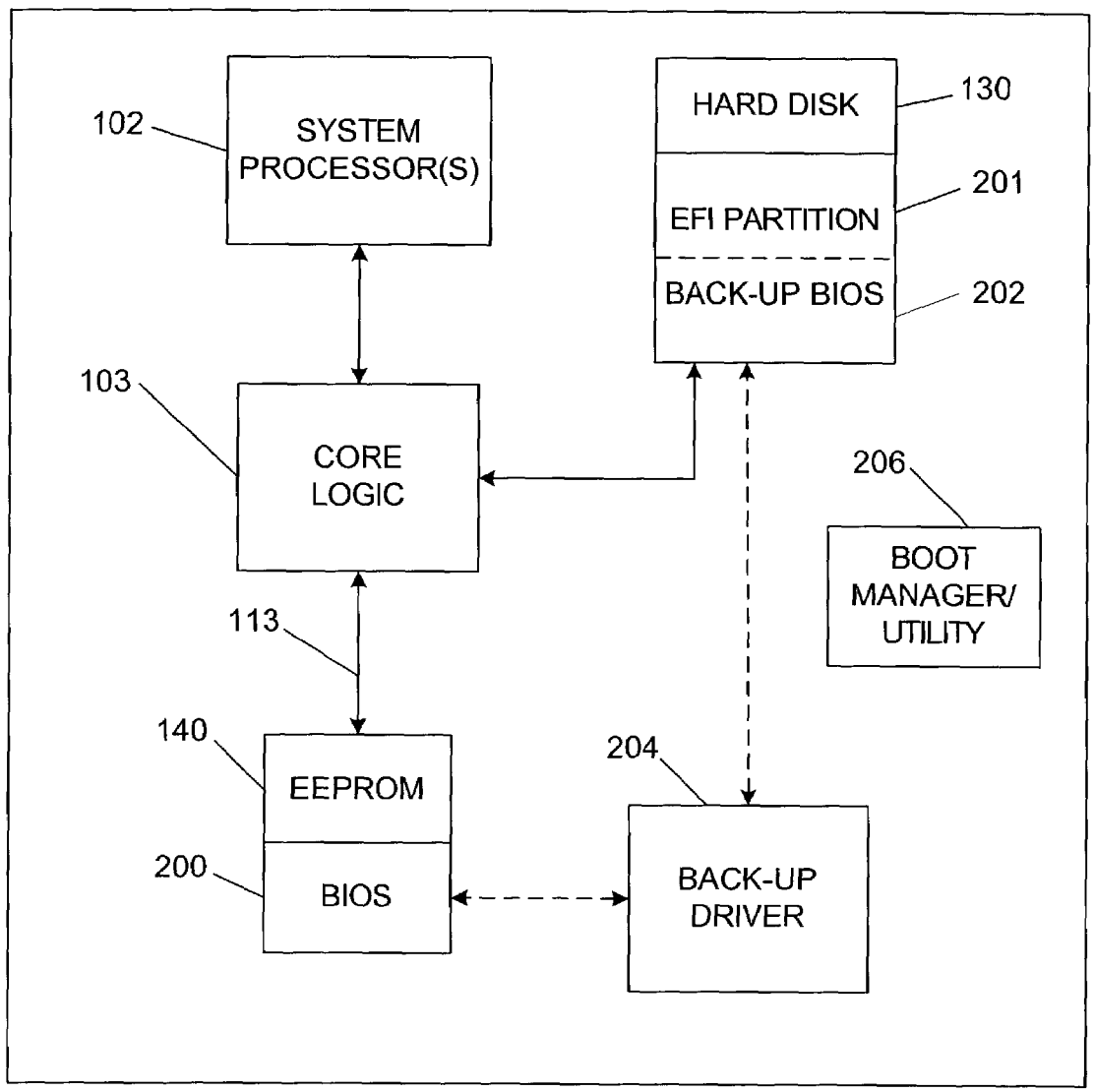
FIG. 2 is a functional block diagram of one exemplary embodiment of the present invention.

FIG. 2 shows a functional block diagram of one exemplary embodiment of the present invention. A system BIOS 200 is stored in the EEPROM 140. One of the system hard disks 130 includes an Extensible Firmware Interface (EFI) partition 201. The EFI partition 201 is present in a computer system that is operating according to the EFI standard. The EFI partition 201 is an organizational unit of the hard disk 130, but it is not limited as to the amount of information it may contain. Information needed to support the EFI operating environment is typically stored on the EFI partition 201.

While the exemplary embodiment shown in FIG. 2 illustrates an EFI partition, those of ordinary skill in the art will appreciate that the invention is not limited to the EFI operating environment. The present invention may be applicable to any system environment in which the system BIOS has access to a back-up partition (such as the EFI partition) while the computer system is in a pre-boot state.

A back-up BIOS 202 is stored on the EFI partition 201. The back-up BIOS 202 takes the place of the back-up BIOS that would have previously been stored in additional EEPROM. In the EFI operating environment, the information stored on the hard disk 130 or other media, such as the back-up BIOS 202, is accessible in a pre-boot environment. This means that the information stored on the hard disk 130 or other media may be accessed, manipulated, upgraded and/or replaced whether or not the computer system is powered on and booted.

Storing the back-up BIOS 202 on the EFI partition 201 of the hard disk 130 conserves the amount of EEPROM contained in the computer system 100. Cost is saved accordingly because less EEPROM may be used. Alternatively, the same amount of EEPROM may be used, but the space saved by storing back-up versions of the BIOS may instead be used to store programming that provides additional features instead of being used for back-up purposes. The placement of the back-up BIOS 202 on the hard disk 130 gives developers of computer systems greater flexibility in utilizing the amount of EEPROM that is available to them.

The back-up BIOS 202 may be stored in a separate subdirectory under the EFI partition 201. The subdirectory that stores the back-up BIOS 202 may be hidden and/or designated as a system directory. Additionally, multiple versions of back-up BIOS 202 may be stored on the EFI partition 201. Back-up of multiple versions of BIOS is feasible because hard disk space is relatively inexpensive compared to EEPROM memory.

In addition to storing the back-up BIOS 202 on the EFI partition 201, back-up BIOS and other firmware may be stored on other types of storage media as well. The EFI partition 201 on the primary hard drive of the computer system is a convenient place because the EFI partition is present after installation of an OS on the hard disk 130. Nonetheless, back-up versions of the system BIOS or other firmware may be stored on a back-up partition on any other storage media such as a R/W CDROM disk or LS-120/240 floppy disk or any other device that is accessible to the system BIOS in a pre-boot environment.

A back-up driver 204 may be adapted to access both the system BIOS 200 and the back-up BIOS 202. The back-up driver 204 may be integrated into the BIOS or other system firmware. The back-up driver 204 may be designed to be invoked automatically upon entry into the EFI operating environment. The back-up driver 204 may determine whether the EFI system partition 201 exists. If the EFI system partition 201 is present, the back-up driver 204 may check to see if a subdirectory containing back-up versions of the system BIOS or other firmware is present on the EFI system partition 201. The back-up driver 204 may include the capability to create additional multiple back-up versions of the system BIOS or other firmware. For example, if the system BIOS 200 has recently been updated, the back-up driver 204 may store a back-up of the new BIOS in the appropriate subdirectory on the EFI partition 201.

The back-up driver 204 may be additionally adapted to automatically detect corruption of the system BIOS 204. Upon detection of corruption of the system BIOS 200, the back-up driver 204 may be adapted to automatically identify a back-up BIOS on the EFI partition 201 and to automatically reprogram that the back-up BIOS into the EEPROM 140. After the system BIOS has been replaced with the back-up version, the back-up driver 204 may force a cold boot or restart of the computer system 100 so that the newly updated BIOS will be executed.

In addition to the back-up driver 204 an EFI boot manager or utility 206 (sometimes referred to as a ROM-based setup utility) may be created to manage back-up versions of the system BIOS 200 or other firmware. The boot manager 206 may include a menu option that includes a variety of choices for a user of the system. For example, the boot manager may allow the user to create back-ups of existing system BIOS or other firmware. A separate indicia or menu entry may be created and displayed for each back-up version of the system BIOS or other firmware that is stored on the EFI partition 201.

The boot manager 206 may be adapted to present the user with the option to replace the existing system BIOS 200 with one of the backed up versions stored on the EFI partition. The user may then select to update the existing system BIOS 200 (for example, by flashing the EEPROM 140) with one of the previous back-up BIOS versions. After the system BIOS has been replaced with the back-up version, the boot manager 206 may force a cold boot or restart of the computer system 100 so that the newly updated BIOS will be executed.

The back-up driver 204 and the boot manager 206 may appear to the user to operate in the same manner as corresponding programs operated when a back-up version of the system BIOS was stored in EEPROM memory. In other words, the operation of the back-up utility 202 and the boot manager 206 may be transparent to the user of the computer system who are used to systems in which the BIOS is backed up in additional EEPROM memory. This user transparency is desirable because the user will be spared the process of learning new software tools to back up and replace the system BIOS 200 or other firmware.

Figure 3:
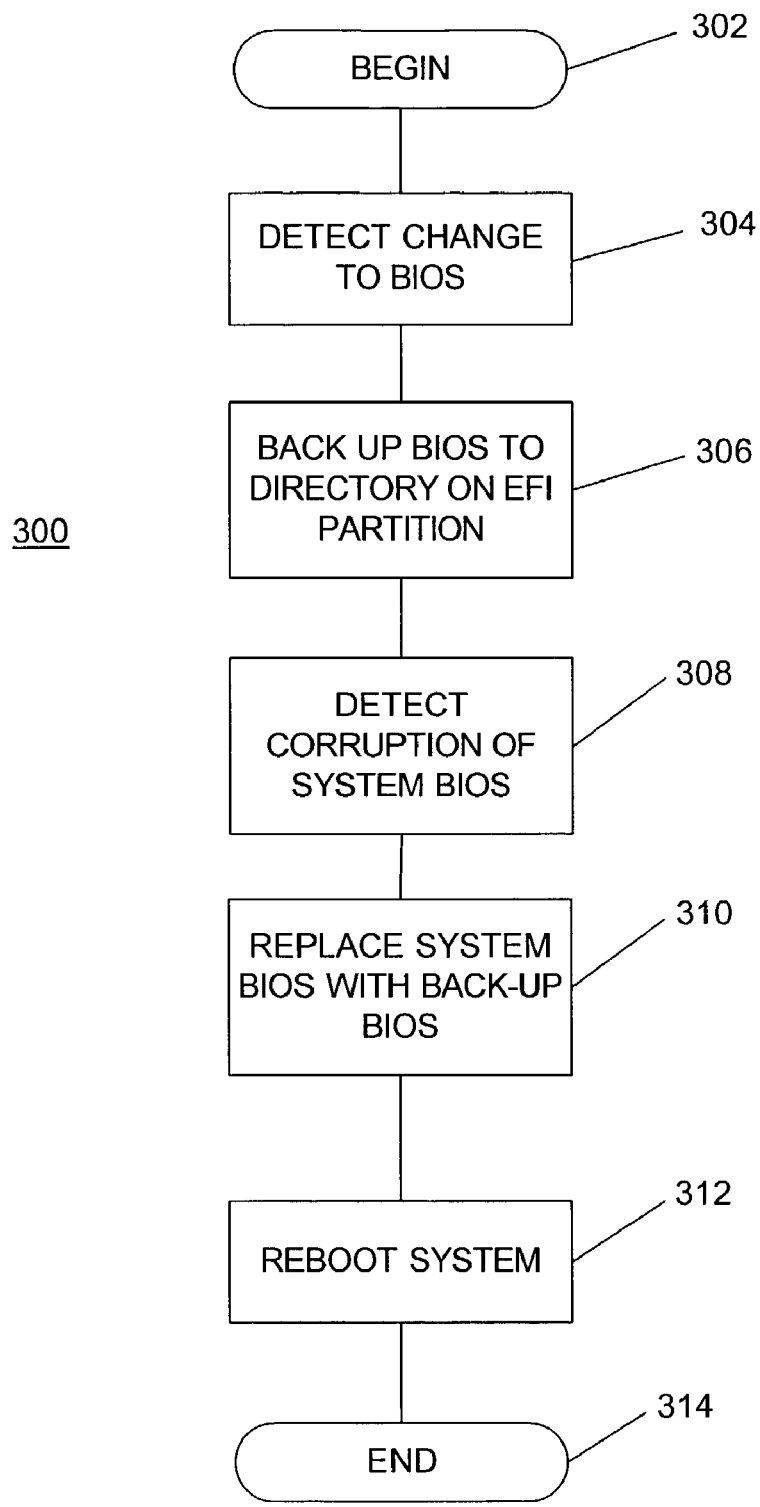
FIG. 3 is a process flow diagram illustrating the operation of an embodiment of the present invention.

FIG. 3 is a process flow diagram illustrating the operation of an embodiment of the present invention. The process is generally referred to by the reference numeral 300. At 302, the process begins.

At 304, a change to the system BIOS 200 (FIG. 2) is detected. This change may be detected by the back-up driver 204 (FIG. 2) or the boot manager 206 (FIG. 2). As explained above, either the back-up driver 204 or the boot manager 206 may be adapted to create a back-up of the system BIOS when the system BIOS is changed, such as after a BIOS upgrade.

At 306, a back-up of the system BIOS 200 is created on the system EFI partition. As set forth above, the back-up on the EFI partition may be created in a special subdirectory, which may be designated as a hidden or system file. The back-up may be made by either the back-up driver 204 or the boot manager 206.

At 308, the back-up driver 204 or the boot manager 206 detects corruption of the system BIOS 200. Detection of corruption is typically performed when the computer system 100 is booted. Corruption may occur for a variety of reasons, including errors that occur when the BIOS is upgraded by flashing the system EEPROM.

When corruption of the system BIOS 200 is detected, the BIOS is replaced with a backup version stored on the EF partition 201, as shown at 310. The back-up version maybe automatically flashed into the system EEPROM 140. The replacement of the system BIOS 200 with a back-up version 202 may be performed by the back-up driver 204, the boot manager 206 or both. After the BIOS is replaced with the back-up version, the computer system 100 is rebooted (as shown at 312) so that the back-up version of the BIOS may be loaded. The process concludes at 314.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A back-up device for a computer system, the computer system having a hard disk drive with an EFI partition, the computer system adapted to execute a system BIOS, the back-up device comprising:
   a back-up driver that is adapted to:
      detect a change to the system BIOS;
      back-up the system BIOS onto the EFI partition to create a back-up BIOS in response to detecting the change to the system BIOS, wherein the back-up driver is adapted to create multiple back-up versions of the system BIOS on the EFI partition; and
      substitute one of the back-up BIOS versions for the system BIOS if the system BIOS is not operable.

2. The back-up device of claim 1 wherein the system BIOS is not operable because it is corrupt.

3. The back-up device of claim 1 wherein the system BIOS is not operable because it is invalid.

4. The back-up device of claim 1 wherein the back-up driver is adapted to reboot the computer system after substituting the back-up BIOS for the system BIOS.

5. A back-up device for a computer system, the computer system having a storage media with a back-up partition, the computer system adapted to execute a system BIOS, the back-up partition adapted to store a plurality of back-up versions of the system BIOS, the back-up device comprising:
   a boot manager that is adapted to:
      copy the plurality of back-up versions of the system BIOS to the back-up partition in response to detecting a plurality of changes in the system BIOS;
      display an indicia corresponding to each of the back-up versions of the system BIOS;
      responsive to input from a user, substitute a selected back-up version selected from the plurality of back-up versions of the system BIOS for the system BIOS; and
      reboot the computer system after substituting the selected back-up version for the system BIOS.

6. The back-up device set forth in claim 5, wherein the system BIOS is stored in an EEPROM memory.

7. The back-up device of claim 5 wherein the storage media is a hard disk.

8. The back-up device of claim 5 wherein the storage media is a floppy disk.

9. The back-up device of claim 5 wherein the storage media is a R/W CDROM disk.

10. The back-up device of claim 5 wherein the back-up partition is an Extensible Firmware Interface (EFI) partition.

11. A computer system, the computer system comprising:
   a microprocessor that executes commands;
   a core logic chipset that is connects to the microprocessor;
   a user input device for providing user input to the microprocessor;
   a system BIOS stored on a first storage media, the system BIOS being adapted to be executed by the microprocessor;
   a hard disk drive connected to the core logic chipset, the hard disk drive being adapted to store data for use by the microprocessor, the hard disk drive having an EFI partition; and
   a back-up driver that is adapted to:
      detect a change to the system BIOS;
      back-up the system BIOS onto the EFI partition to create a back-up BIOS in response to detecting the change to the system BIOS, wherein the back-up driver is adapted to create multiple back-up versions of the system BIOS on the EFI partition and
      substitute one of the back-up BIOSs versions for the system BIOS if the system BIOS is not operable.

12. The computer system of claim 11 wherein the back-up driver is adapted to reboot the computer system after substituting the back-up BIOS for the system BIOS.

13. The computer system of claim 11 wherein the first storage media is an EEPROM memory.

14. A computer system, the computer system comprising:
   a microprocessor that executes commands;
   a core logic chipset that is connects to the microprocessor;
   a user input device for providing user input to the microprocessor;
   a system BIOS stored on a first storage media, the system BIOS being adapted to be executed by the microprocessor;
   a second storage media connected to the core logic chipset, the storage media being adapted to store data for use by the microprocessor, the storage media having a back-up partition, the back-up partition being adapted to store a plurality of back-up versions of the system BIOS;
   a boot manager that is adapted to:
      copy the at least one back-up version of the system BIOS to the back-up partition in response to detecting a change in the system BIOS;
      display an indicia corresponding to each of the at least one back-up version of the system BIOS;
      responsive to input from a user, substitute a selected back-up version selected from the at least one back-up versions of the system BIOS for the system BIOS; and
      reboot the computer system after substituting the selected back-up version for the system BIOS.

15. The computer system of claim 14 wherein the first storage media is an EEPROM memory.

16. The computer system of claim 14 wherein the second storage media is a hard disk.

17. The computer system of claim 14 wherein the second storage media is a floppy disk.

18. The computer system of claim 14 wherein the second storage media is a R/W CDROM disk.

19. The computer system of claim 14 wherein the back-up partition is an Extensible Firmware Interface (EFI) partition.

20. A method of updating a system BIOS in a computer system that is operating in a pre-boot environment in which the system BIOS has access to an EFI partition, the system BIOS being stored on a first storage media, the computer system having a hard disk drive that includes the EFI partition, the method comprising the acts of:
  detecting a change to the system BIOS;
  backing up multiple versions of the system BIOS to the EFI partition to create multiple back-up versions of the system BIOS in response to detecting changes to the system BIOS;
  detecting whether the system BIOS is inoperable; and
  replacing the system BIOS with the one of the multiple back-up BIOSs versions in response to detecting that the system BIOS is inoperable.

21. The method of claim 20, further comprising rebooting the computer system after replacing the system BIOS with the back-up BIOS.

22. The method of claim 20 wherein the first storage media is an EEPROM memory.

23. The back-up device of claim 1, wherein the back-up driver is adapted to prompt a user to select which one of the multiple back-up BIOS versions is substituted for the system BIOS.

24. The back-up device of claim 1, wherein the back-up driver is adapted to display a menu comprises each one of the multiple back-up BIOS versions.

25. The computer system of claim 11, wherein the back-up driver is adapted to prompt a user to select which one of the multiple back-up BIOS versions is substituted for the system BIOS.

26. The method of claim 20, comprising prompting a user to select which one of the plurality of back-up BIOSs is substituted for the system BIOS.

27. The method of claim 20, comprising creating an on-screen menu including an entry for each of the multiple back-up BIOS versions.

* * * * *

UNITED STATES PATENT AND TRADEMARK OFFICE
CERTIFICATE OF CORRECTION

| | | |
|---|---|---|
| PATENT NO. | : 7,143,275 B2 | Page 1 of 1 |
| APPLICATION NO. | : 10/210274 | |
| DATED | : November 28, 2006 | |
| INVENTOR(S) | : Darren J. Cepulis et al. | |

It is certified that error appears in the above-identified patent and that said Letters Patent is hereby corrected as shown below:

In column 2, line 62, delete "bootblack" and insert -- bootblock --, therefor.

In column 7, line 8, delete "EF" and insert -- EFI --, therefor.

In column 8, line 27, in Claim 11, delete "partition" and insert -- partition; --, therefor.

Signed and Sealed this

Thirty-first Day of March, 2009

JOHN DOLL
*Acting Director of the United States Patent and Trademark Office*